March 4, 1969   A. J. PETERSEN ET AL   3,431,445
ELECTRIC MOTOR BRUSH HOLDER MOUNTING
Filed March 17, 1966
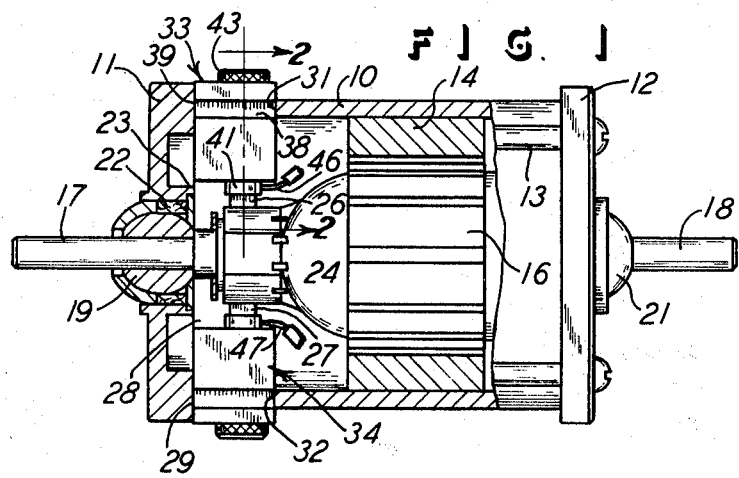
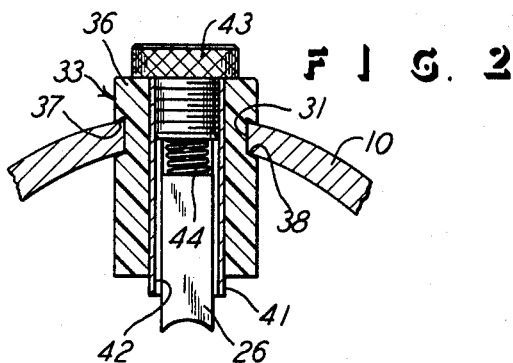
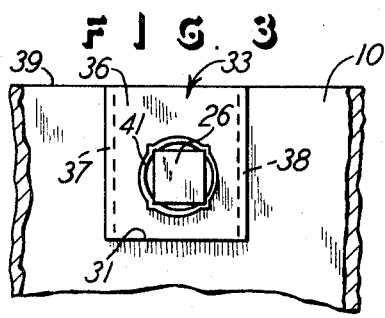
INVENTORS:
ALLEN J. PETERSEN
EVERETT K. HANSEN
BY: *Arthur J. Hansmann*
ATTORNEY

United States Patent Office 3,431,445
Patented Mar. 4, 1969

3,431,445
ELECTRIC MOTOR BRUSH HOLDER MOUNTING
Allen J. Petersen and Everett K. Hansen, McHenry, Ill., assignor to Rae Motor Corporation, McHenry, Ill., a corporation of Delaware
Filed Mar. 17, 1966, Ser. No. 535,088
U.S. Cl. 310—239  4 Claims
Int. Cl. H02k 13/00; H01r 39/40, 39/38

ABSTRACT OF THE DISCLOSURE

An electric motor brush holder mounting, wherein the motor casing is provided with end notches for slidably snugly receiving the brush holder. An end plate is positioned over the brush holders and the end of the casing to finally secure the brush holders to the casing and to provide a bearing for the motor armature.

---

This invention relates to an electric motor, and, more particularly, it relates to a motor with a novel means for mounting the brush holder.

The prior art discloses many different ways of mounting brush holders in electric motors. In fact, this has been a matter of concern to makers of electric motors for some time. Some brush holders are secured to the motor casing by means of being threaded into the casing, by separate screws, or by other retaining means such as clamps. Those arrangements thus all require a special type of connector extending between the brush holder and the remainder of the motor.

Other prior art arrangements include the mounting of the brush holder by means and in a manner such that special insulation is then required to prevent the shorting of the motor from the brush itself to the motor casing.

It is a general object of this invention to improve the brush holder mountings for electric motors. In accomplishing this object, the electric motor and assembled brush holder of this invention is an improvement over the arrangements heretofore known.

A more specific object of this invention is to provide an electric motor with a brush holder assembly which does not require any special connecting devices, such as screws or clamps, for securing the brush holder assembly to the motor casing. In accomplishing this object, this of course means that the entire motor can be manufactured and assembled without the requirement for the special connectors and without requiring special assembly, such as alignment of the parts for threading them together, and the like.

Another object of this invention is to provide an electric motor and brush holder assembly in a manner to utilize the assembly and securing of the motor housing parts in locating and retaining the brush holder assembly to the motor housing itself.

Another object of this invention is to accomplish the aforementioned objects in an electric motor which is easy to manufacture, inexpensive, reliable and accurate in its construction and function, and which can be easily and readily repaired if needed to be repaired.

Other objects and advantages become apparent upon reading the following description in light of the accompanying drawings, wherein:

FIG. 1 is a side elevational view of an electric motor of this invention, and with parts thereof broken away.

FIG. 2 is an enlarged sectional view taken along the line 2—2 of FIG. 1.

FIG. 3 is a bottom plan view of FIG. 2.

The electric motor is shown to include a cylindrical casing 10 and an end cap or plate 11 and an end cap or plate 12. The casing 10 and plates 11 and 12 constitute the motor housing, and the three pieces are secured together by the bolts 13 which extend between the caps 11 and 12 in any well-known manner. A stator 14 and an armature 16 are disposed within the casing 10, and the armature 16 is of course rotatable therein and it is rotatably supported in the end caps 11 and 12 in any well-known manner. Thus the armature shafts 17 and 18 extend outside of the motor housing, and the shafts are supported in bearings 19 and 21 respectively. The bearings of course are secured in the respective end caps 11 and 12, and the bearing 19 is shown to have an oil wick 22 and a bearing retainer plate 23, all being conventional parts. Also, the armature 16 includes the commutator 24 which rotates with the rotation of the armature 16, in the usual manner, and the electric brushes 26 and 27 are in contact with the commutator 24 as the latter rotates, all in the conventional manner.

The casing 10 presents an open end 28 wherein the commutator 24 and the brushes 26 and 27 are found. The casing also has a planar edge 29 which is a planar circular wall defining and surrounding the open end 28. Two recesses or notches 31 and 32 are present in the casing 10 and extend from the edge 29 to the limit of the brush holder assemblies designated 33 and 34 and disposed in the notches 31 and 32, as shown.

FIG. 2 shows the casing 10 and the notch 31 receiving the brush holder assembly 33. The assembly 33 includes the brush holder 36, which is made of an electrical insulating material, such as a rigid plastic material. The holder 36 has grooves 37 and 38 on the sides thereof, and these grooves snugly receive the respective edges of the casing 10 defining the casing notch 31.

In this manner, the brush holder assembly 33 is fixedly secured to the casing 10 in that the assembly cannot move radially with respect to the axis of the armature 16 because of the tongue-and-groove type of assembly between the casing 10 and the brush holder 36. Further, the brush holder 36 is shown to extend for the full length of the notch 31, and the end cap 11 then also abuts the brush holder 36 along the line 39 to retain the brush holder 36 firmly in the notch 31. Thus no screws, clamps, or the like are required to assemble and retain the brush holder 36 to the casing 10.

The brush holder assemblies 33 and 34 also have an insert 41 which is of an electrical conducting material, such as brass. The inserts 41 have openings 42 extending therethrough, and the inserts extend beyond the lengths of the brush holders 36, as shown in FIG. 2. It will then be also noted that the brush 26 is suitably slidably supported in the sleeve 41, as desired. A cap screw 43 is threaded into the upper end of the sleeve 41, in the usual manner, and a compression spring 44 is disposed between the screw 43 and the brush 26 to yieldingly urge the latter into sliding contact with the commutator 24, in the usual manner also. Wires 46 and 47 are then connected to the respective sleeves 41 of the assemblies 33 and 34, and form the necessary electrical connections to the motor. Thus the usual electrical contact is made between the commutator 24 and the wires 46 and 47, all through the brushes 26 and 27 and the sleeves 41.

The drawings further show that the brush holders 36 are of suitable size to be sufficiently sturdy for their function of slidably supporting the brushes 26 and 27, and to do so against the force tending to rotate the brushes 26 and 27 by virtue of their sliding contact with the commutator 24. That is, the brush holders 36 extend beyond the casing 10 since no screws are required to mount the brush holders, and thus adequate size or stock in the brush holders 36 is provided for the strength needed. Further, the sleeves 41 are offset in the holders 36 to properly align the brushes 26 and 27 with the commutator.

While a specific embodiment of this invention has been shown and described, it should be obvious that certain changes could be made in the embodiment and the invention should therefore be determined only by the scope of the appended claims.

What is claimed is:

1. In an electric motor, a stator, an armature rotatable within said stator and including a commutator, a casing surrounding said stator and said armature and having an open end receiving said commutator and an edge defining and surrounding said open end, said edge having two brush-receiving openings extending therein, a brush holder disposed in each of said openings and being affixed to said casing, each of said brush holders having a brush-receiving pocket aligned with said commutator, a brush disposed in each of said pockets and in contact with said commutator, an end plate disposed over said edge and enclosing said open end and providing a rotatable support for said armature, releasable means connected to said end plate for securing the latter to said casing, the improvement comprising said openings being notches with each of said notches being defined by two parallel and spaced-apart side walls on said casing and an end wall extending between said side walls to form the base of said notch, and each of said brush holders being rigid and having grooves on opposite sides thereof for snug reception of the thickness of said casing at said two walls upon sliding said brush holders in the direction axially of said armature to secure said brush holders against movement on said casing.

2. The subject matter of claim 1, wherein the depth of each of said notches to said end wall in the direction away from said end plate is the same as the corresponding dimension of said brush holder, said brush holder extending between and being in abutment with both said end wall of said casing and said end plate, for further securing said brush holders against movement on said casing.

3. The subject matter of claim 1, wherein said casing is cylindrical about the axis of said armature, and said brush holders have grooves on opposite sides thereof and disposed at non-parallel angles relative to each other to conform to the curvature of said casing for snug reception of the thickness of said casing and along the curvature thereof to secure said brush holders against movement on said casing.

4. The subject matter of claim 1, wherein said brush holders are of an electrically non-conductive, non-resilient, rigid plastic material for insulating between said casing and said brushes.

References Cited

UNITED STATES PATENTS

| | | | |
|---|---|---|---|
| 2,548,631 | 4/1951 | Stapleton | 310—247 |
| 2,748,302 | 5/1956 | Boeckel | 310—247 |
| 3,313,966 | 4/1967 | Kasajima | 310—239 |

ORIS L. RADER, *Primary Examiner.*

G. NUNEZ, *Assistant Examiner.*

U.S. Cl. X.R.

310—247